Figure 4:
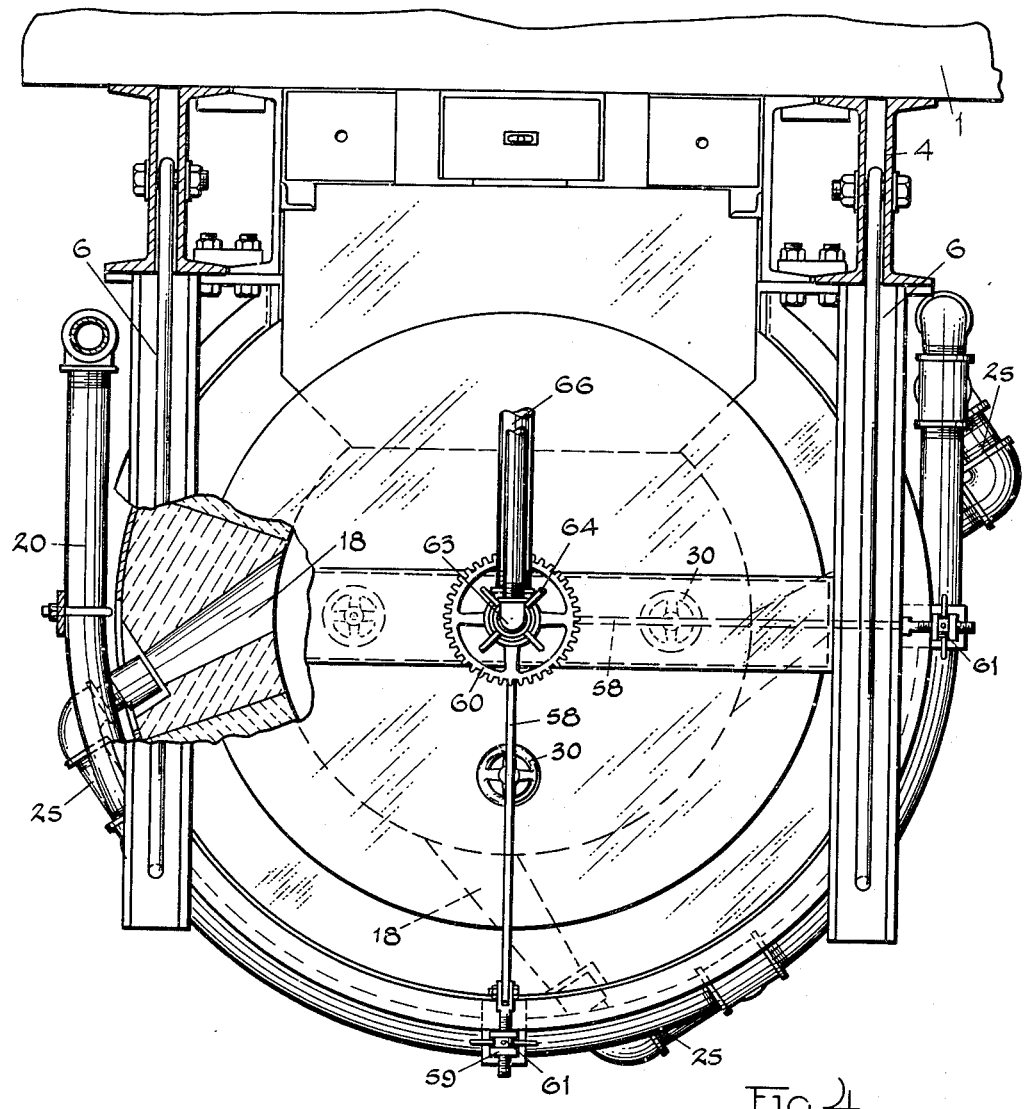

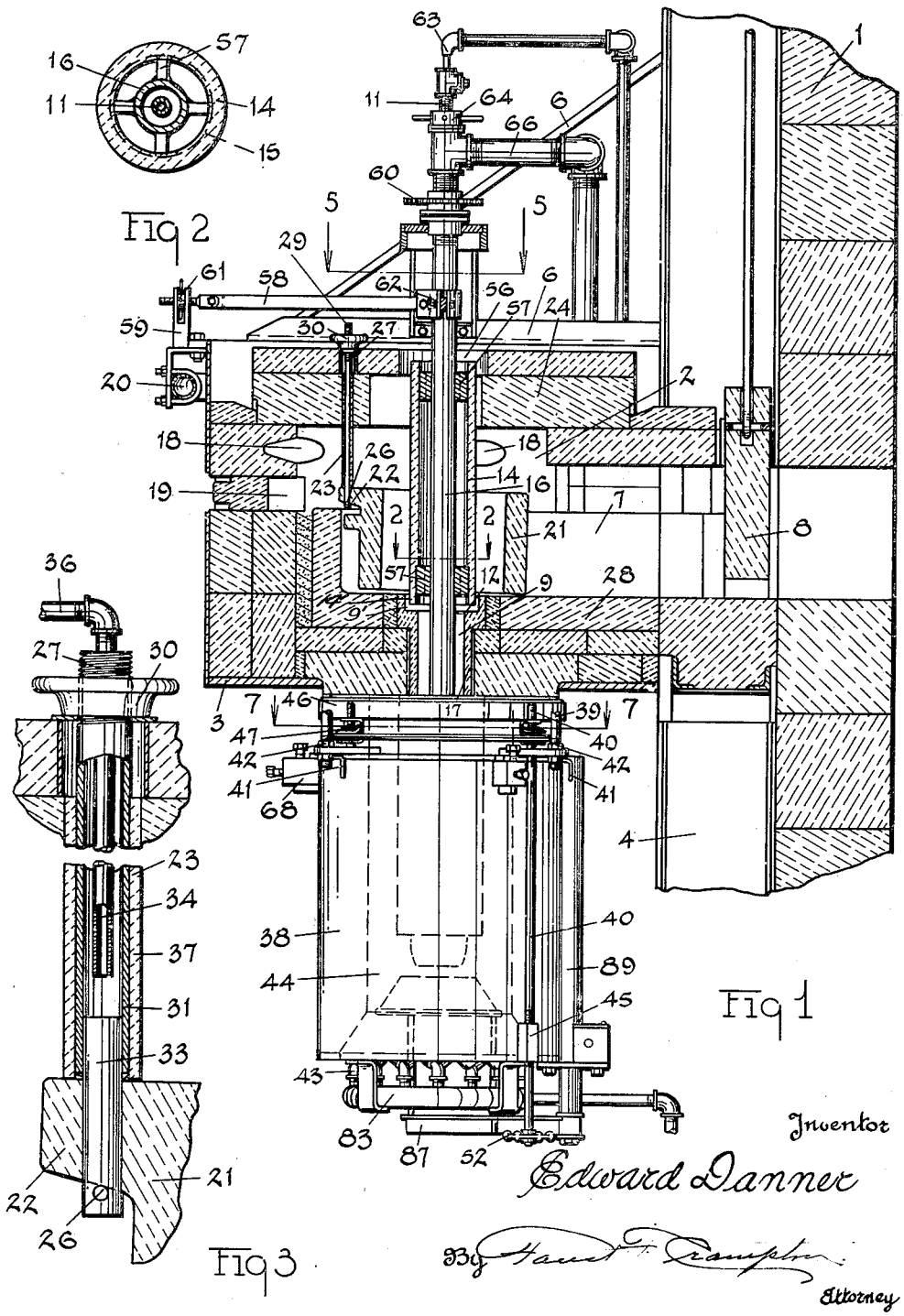

Feb. 22, 1949.  E. DANNER  2,462,805
APPARATUS FOR FORMING GLASS
TUBING, RODS AND THE LIKE
Filed Dec. 17, 1941  13 Sheets-Sheet 2

Inventor
Edward Danner
By Harold F. Crampton
Attorney

Inventor
Edward Danner
By [signature]
Attorney

Feb. 22, 1949.  E. DANNER  2,462,805
APPARATUS FOR FORMING GLASS
TUBING, RODS AND THE LIKE
Filed Dec. 17, 1941  13 Sheets-Sheet 6

Inventor
Edward Danner
By
Attorney

Feb. 22, 1949.   E. DANNER   2,462,805
APPARATUS FOR FORMING GLASS
TUBING, RODS AND THE LIKE

Filed Dec. 17, 1941   13 Sheets-Sheet 8

Inventor
Edward Danner
By Faust & Crampton
Attorney

Feb. 22, 1949.  E. DANNER  2,462,805
APPARATUS FOR FORMING GLASS
TUBING, RODS AND THE LIKE
Filed Dec. 17, 1941  13 Sheets-Sheet 9
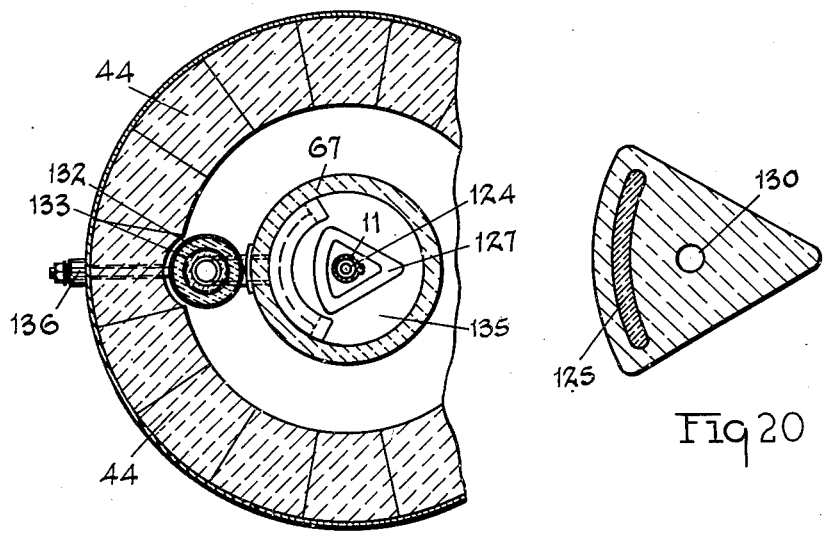
Fig 17
Fig 20
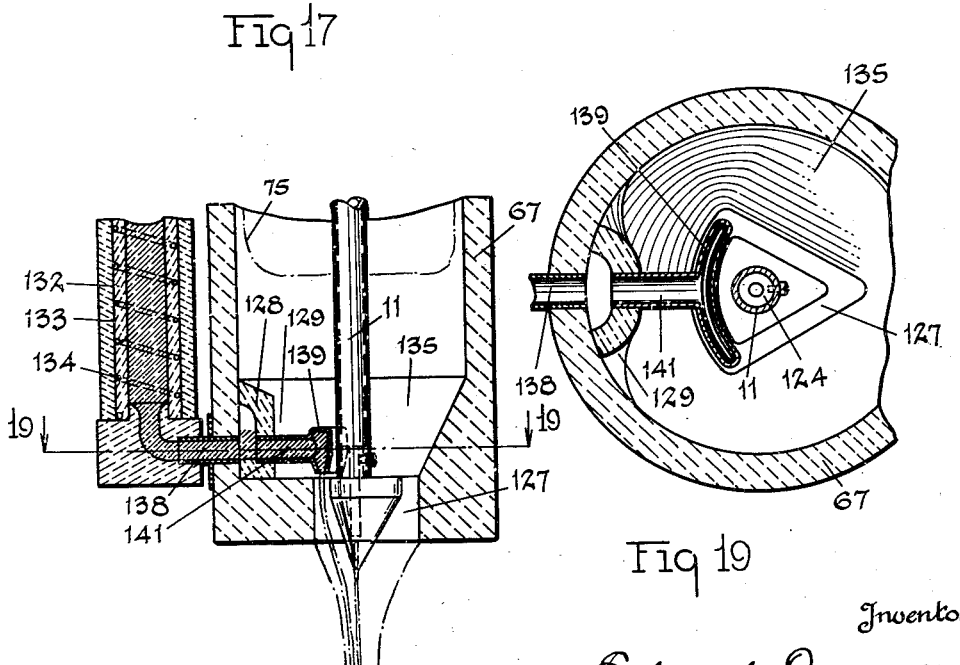
Fig 18
Fig 19
Inventor
Edward Danner
By
Attorney

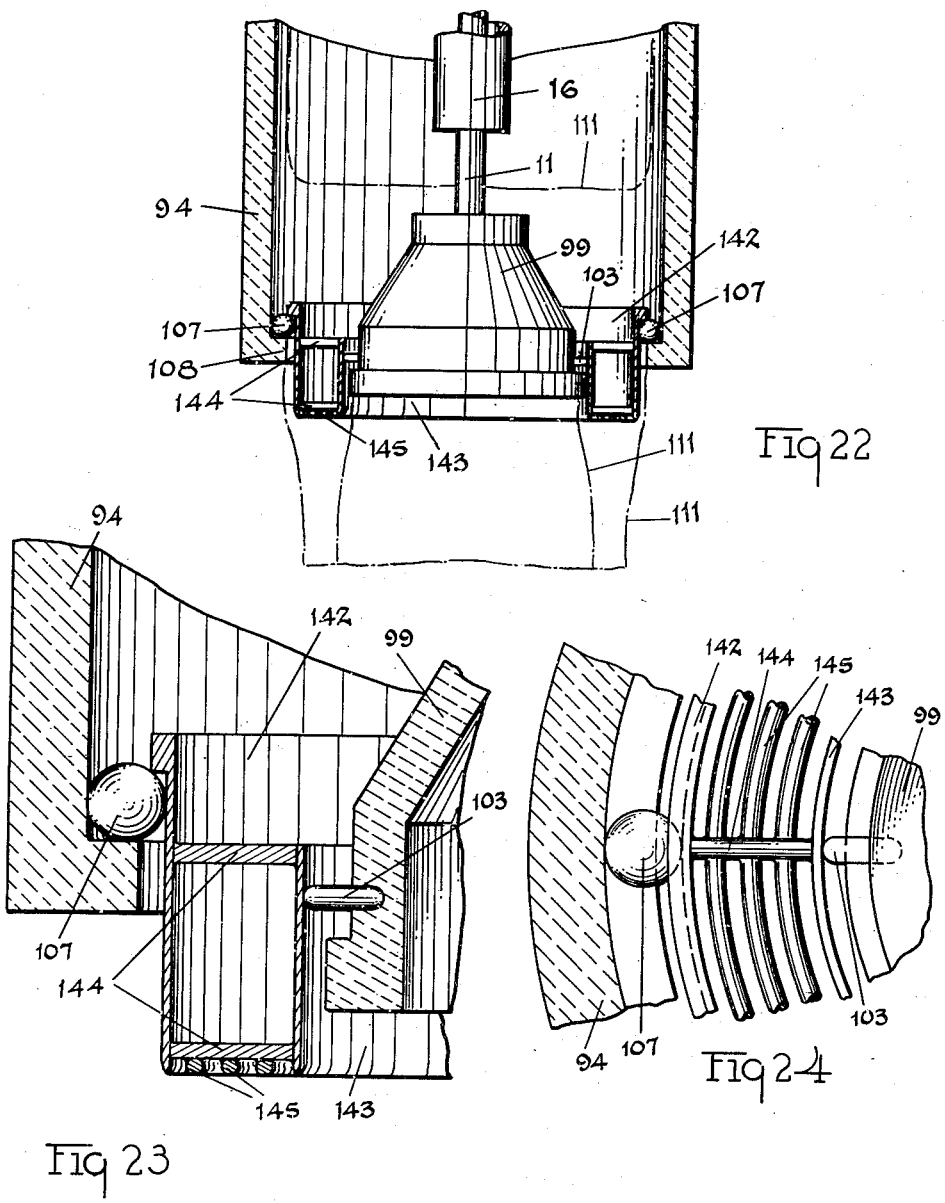

Feb. 22, 1949.  E. DANNER  2,462,805
APPARATUS FOR FORMING GLASS
TUBING, RODS AND THE LIKE
Filed Dec. 17, 1941  13 Sheets-Sheet 12
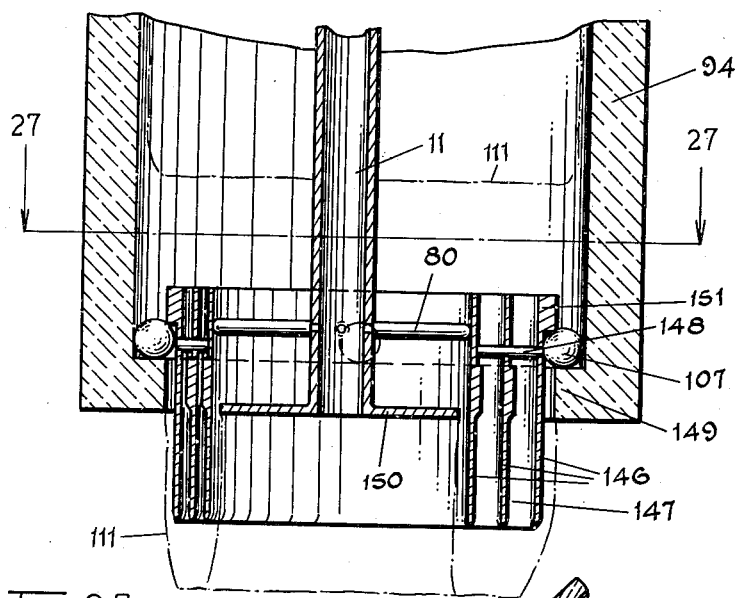
Fig 25
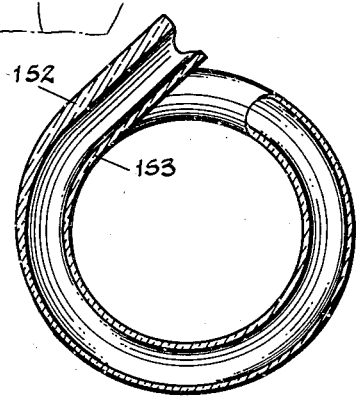
Fig 26
Fig 28
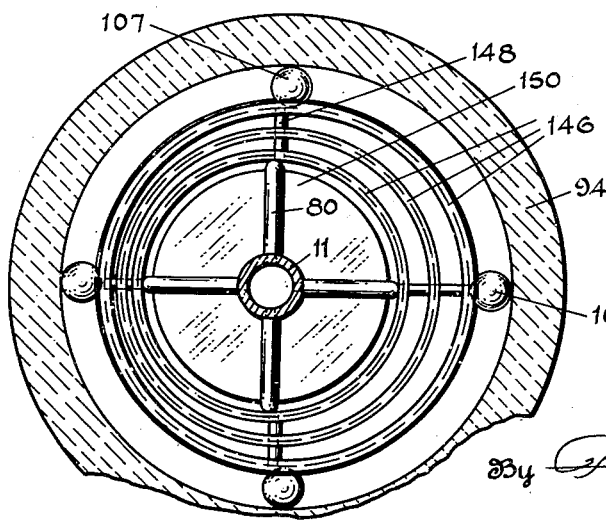
Fig 27
Inventor
Edward Danner
By
Attorney

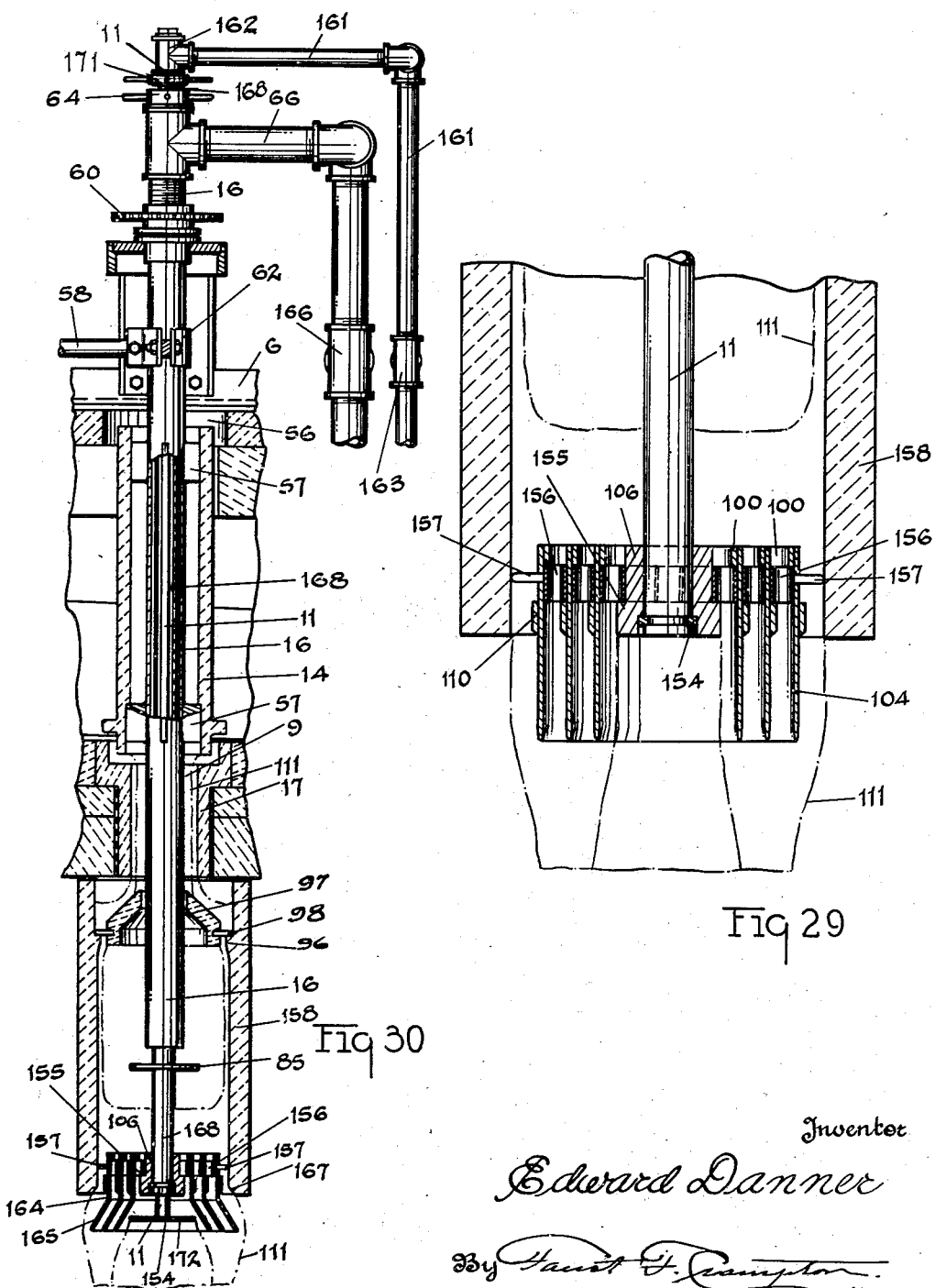

Patented Feb. 22, 1949

2,462,805

UNITED STATES PATENT OFFICE 2,462,805

APPARATUS FOR FORMING GLASS TUBING, RODS AND THE LIKE

Edward Danner, Newark, Ohio

Application December 17, 1941, Serial No. 423,255

6 Claims. (Cl. 49—17.1)

My invention has for its object to provide an improved apparatus for more efficiently producing tubular glass than has heretofore been used, and consists primarily in the coacting relation of improved parts that are embodied in the forebay of a molten-glass producing furnace, and in the glass-article forming device that may regulatively receive the glass from the forebay, or other source of supply of molten glass.

The invention consists in an increased efficiency of a distributor that produces a uniformity of flow of molten glass and, at the same time, controls the quantity rate of flow in the glass-forming device and to the glass-shaping element that is also provided with improved controllable features that coact with means for producing a required uniform viscosity throughout the entire body of the glass shaped by the shaping element. The invention also consists in producing an improved variable shaping element to produce molten glass accumulation and interdiffusion of all of the portions of the molten glass and a uniform glass movement rate from the element and, if desired, a variable quantity rate to produce desirable ware shapes.

The invention also consists in the production of means for efficiently producing small bore tubing of different forms and also ware formed from a plurality of combined molten glasses that are disposed in desired parts or portions, or areas of the ware to produce advantageous results in the use of such ware.

The invention consists in other features and advantages which will appear from the following description and upon examination of the drawings. Structures containing the invention may partake of different forms and still embody the invention. To illustrate a practical application of the invention, I have shown in the drawings a glassware-forming apparatus as an example of the various structures and details thereof that contain the invention and shall describe the structures hereinafter, it being understood that variations may be made and that certain features of my invention may be used to advantage without use of other features of the invention and without departing from the spirit of the invention, as presented in the claims. The structures are shown in the accompanying drawings and are described hereinafter.

Thus, the invention provides a combination of two or more elements that co-act to produce, from a mobile or plastic material when soft, a definitely shaped article, having desired utility when hardened.

Figure 5:
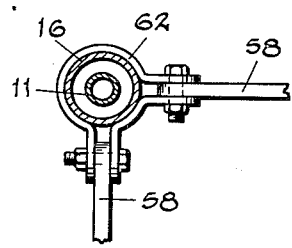
Figure 6:
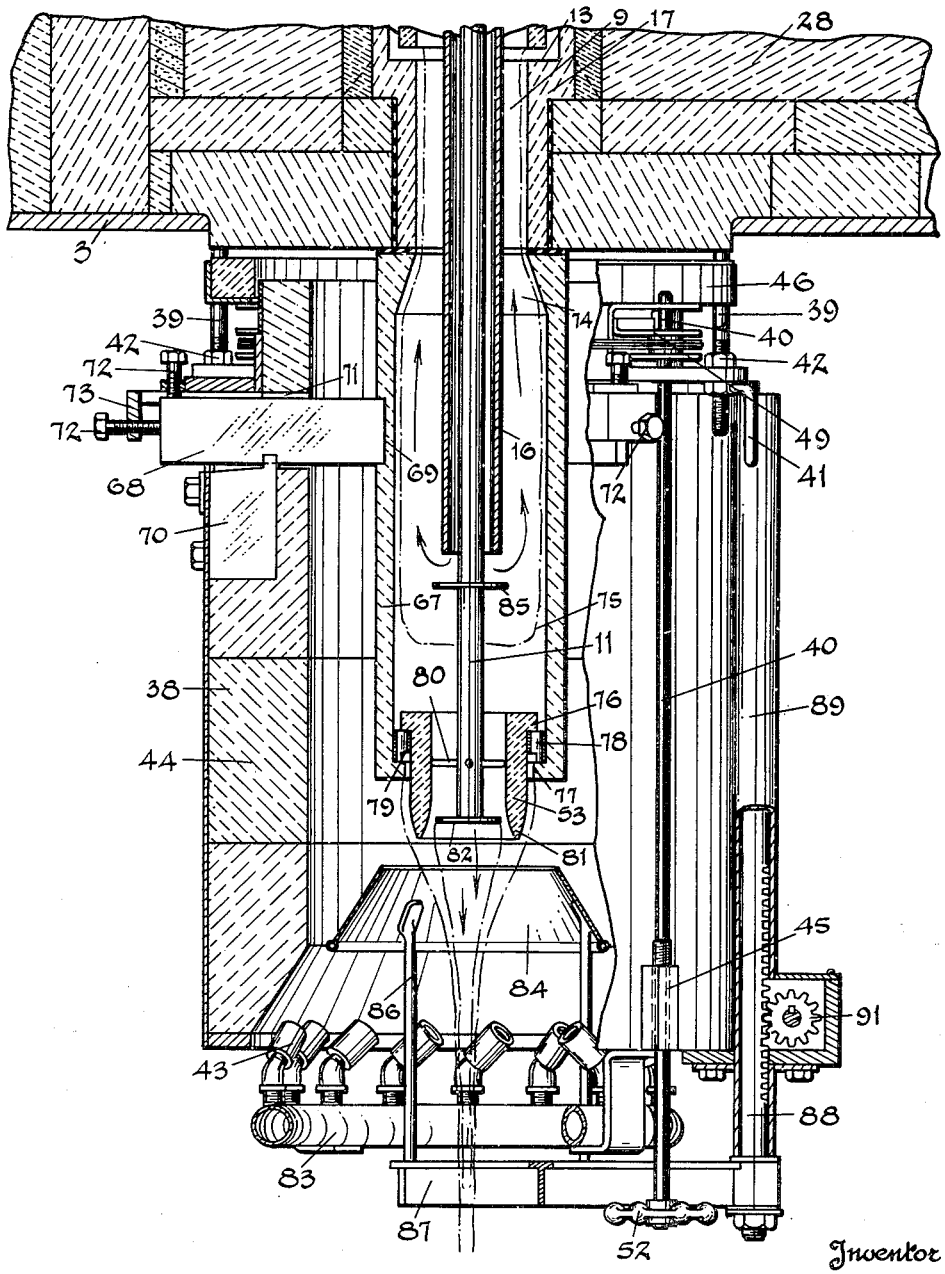
Figure 7:
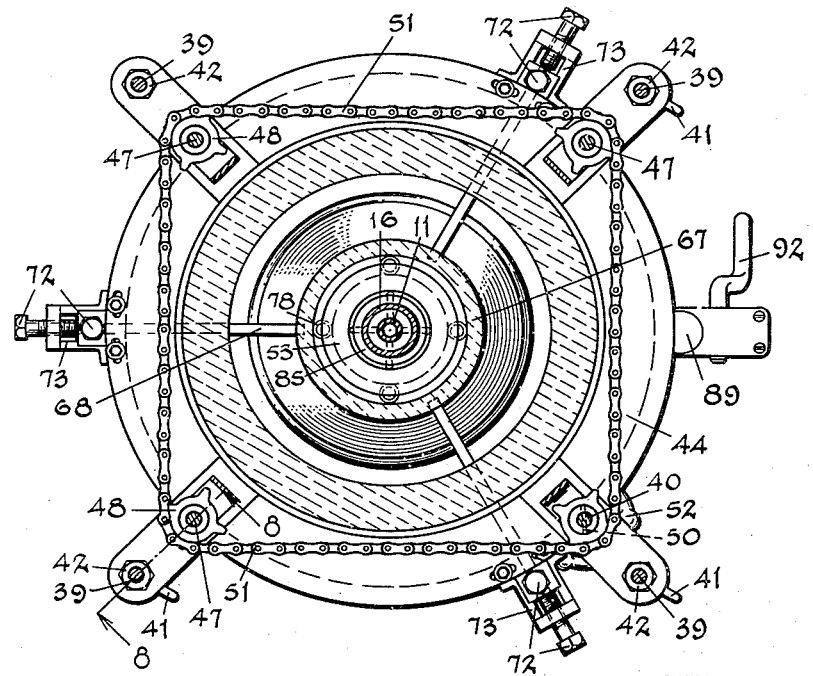
Figure 8:
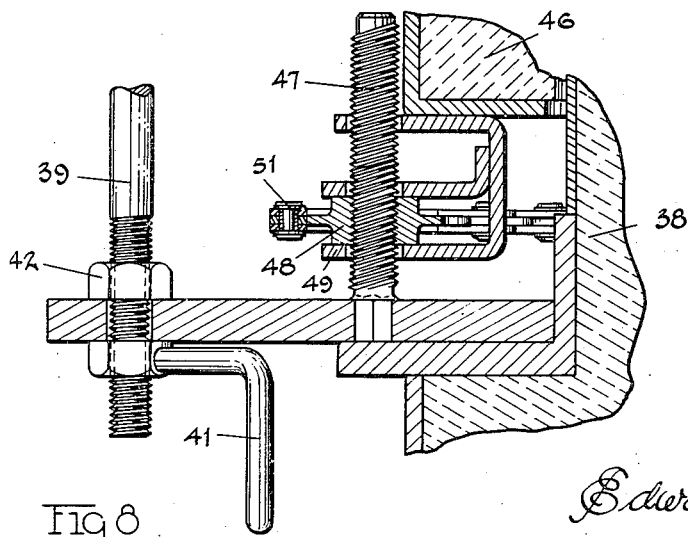
Figure 9:
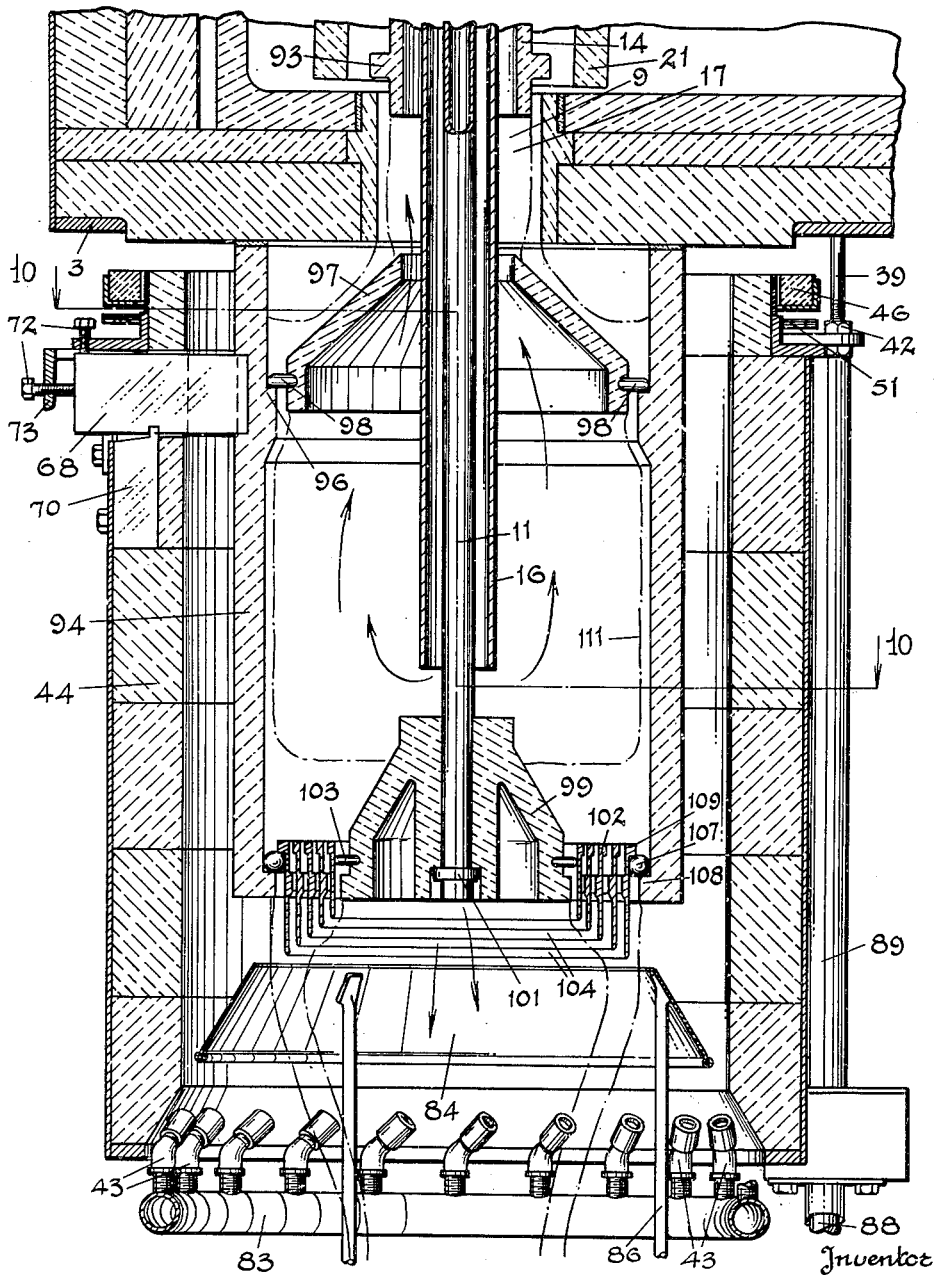
Figure 10:
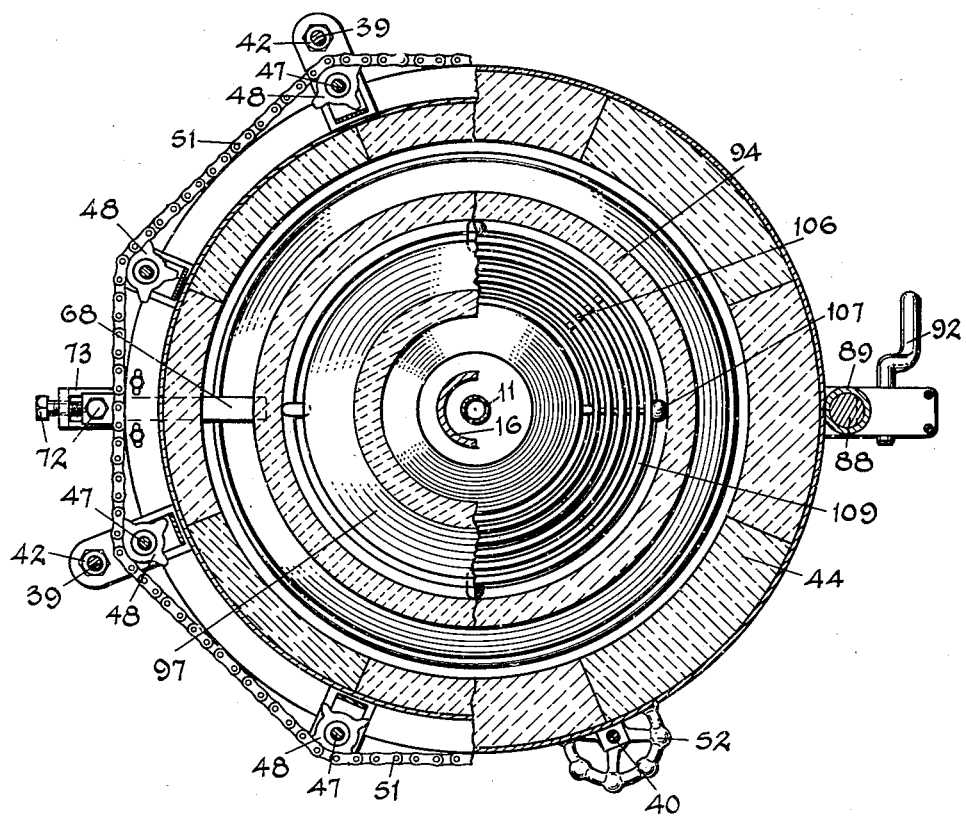
Figure 11:
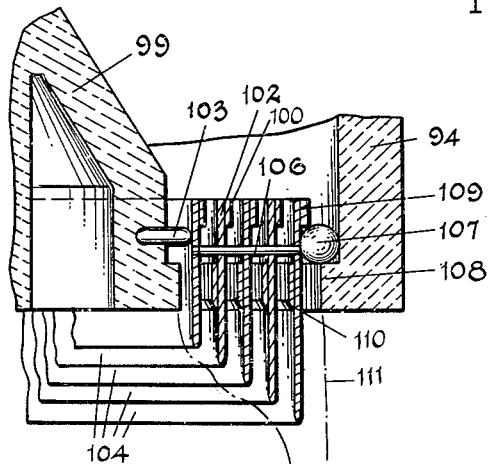
Figure 13:
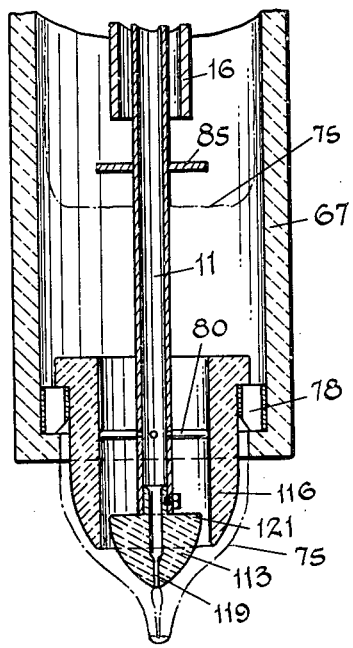
Figure 12:
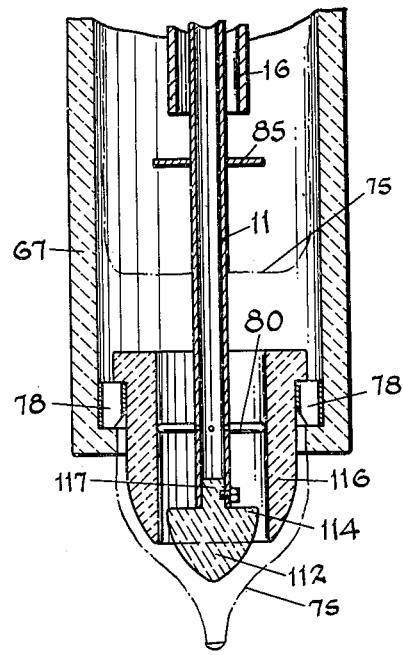
Figure 14:
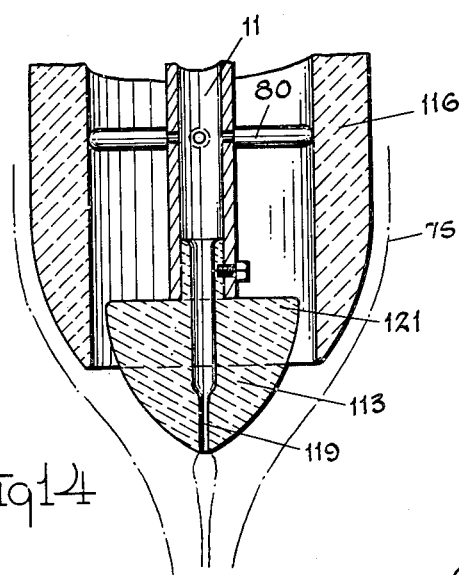
Figure 15:
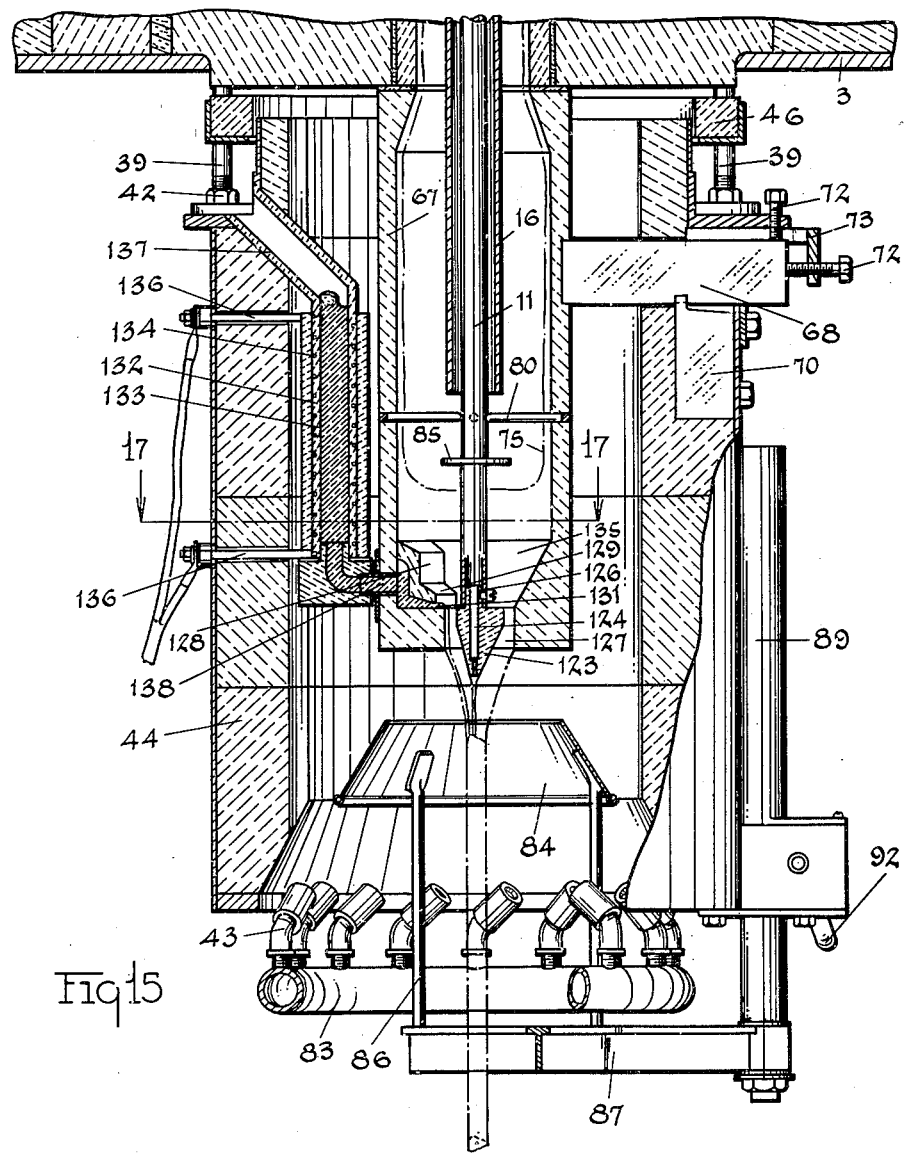
Figure 16:
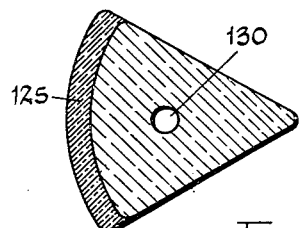
Figure 21:
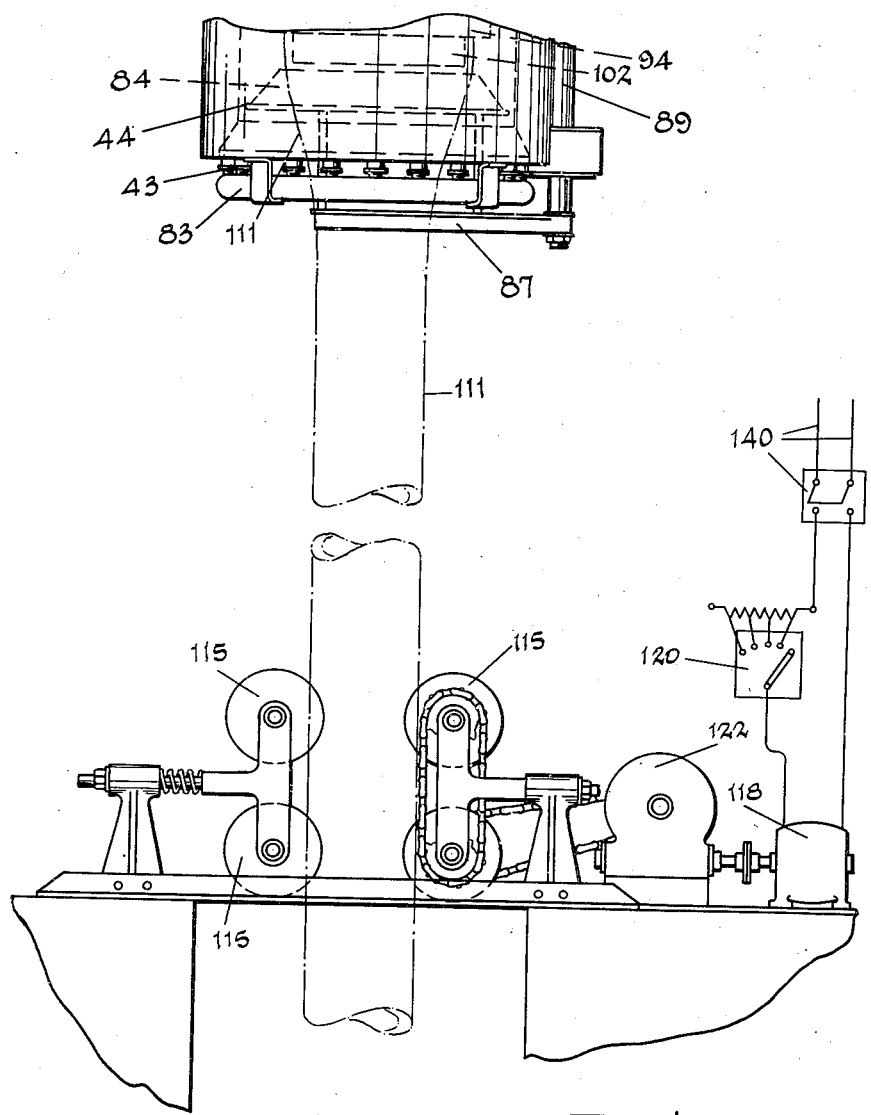

Fig. 1 illustrates a section of a forebay, a part of a furnace wall, and a side view of a glass-forming device supported beneath the forebay. Fig. 2 illustrates a section taken on the plane of the line 2—2 indicated in Fig. 1. Fig. 3 illustrates a section of an air-cooled and a heat-protected means for supporting a refractory molten glass distributor, the said means being a modified form of that shown in Fig. 1. Fig. 4 is a view of the top of the forebay partly in section to show a flame port. Fig. 5 is a view of a section taken on the plane of the line 5—5 indicated in Fig. 1. Fig. 6 is a view partly in section and partly in elevation of the glass-forming mechanism below the forehearth of the structure shown in Fig. 1, the section being taken vertically along the center line of the glass-forming mechanism. Fig. 7 illustrates a view of a section taken on the plane 7—7 indicated in Fig. 1. Fig. 8 is an enlarged view of a section of adjusting means of a heat-confining shell of the glass-forming device and a means for adjusting a damper ring surrounding the upper end of the glass-forming device taken on the plane of the line 8—8, indicated in Fig. 7. Fig. 9 is a vertical section through the center of a modified form of glass-forming device showing a portion of the forehearth from which the glass enters the forming chamber. Fig. 10 is a view of a section taken on the horizontal planes of the broken line 10—10 indicated in Fig. 9. Fig. 11 is an enlarged partial section through the center of the glass-forming apparatus shown in Fig. 9. Fig. 12 is a partial vertical section illustrating a glass shaping element structurally adapted to the formation of small glass rods. Fig. 13 is a partial vertical section illustrating a glass-shaping element for forming glass tubes having a small bore. Fig. 14 is an enlarged, partial sectional view of a part of the glass-shaping element shown in Fig. 13. Fig. 15 is a view, partly in elevation and partly in section, showing a modified form of glass-forming device for forming composite glass articles embodying two different glasses, the section being taken vertically through the center of the forming means. Fig. 16 illustrates a section of the glass tubing formed by the device shown in Fig. 15. Fig. 17 is a view of a section taken on the plane of the line 17—17 indicated in Fig. 15. Fig. 18 is a vertical sectional view showing a part of a modified form of a composite glass-forming device for introducing a molten glass stream of one kind into a stream of another kind of molten glass to produce complete enclosure of the glass of the first stream by the glass of the second stream. Fig. 19 is a view of a section taken in the plane of line 19—19 indicated in Fig. 18. Fig. 20 is a transverse sectional view of the composite glass tube formed by the device shown in Fig. 18. Fig. 21 is a side view of means for regulatively drawing the glass from a glass-shaping element. Fig. 22 is a central vertical section through a portion of the glass-shaping element from which the glass is regulatively drawn by the structure shown in Fig. 21, to reduce excess interior and exterior surface contraction of the article as it cools into final form. Fig. 23 is a partial vertical section through the center of the glass-forming means shown in Figs. 21 and 22. Fig. 24 is a partial horizontal sectional view of the structure shown in Fig. 23 taken on a line immediately above the supporting balls 107. Fig. 25 is a partial central vertical section showing a glass-shaping element that is structurally adapted to form glass tubing having inner and outer eccentric substantially cylindrical surfaces to form a gradual thickening of the wall from one side of the tubing to the other. Fig. 26 is a transverse section through a piece of tubing formed by the element illustrated in Fig. 25. Fig. 27 is a view of a section of the glass-shaping element taken on the plane of the line 27—27 indicated in Fig. 25. Fig. 28 is a view partly in plan and partly in section showing a piece of the tube formed by the glass-shaping element shown in Fig. 25 when the tube has been heated and bent circularly or spirally, and produce substantially uniform wall thickness, circularly, as well as, lengthwise. Figure 29 illustrates a further modified form of a glass-shaping element wherein the element may be centrally supported and may be raised and lowered to adjust it relative to the glass flow. Fig. 30 illustrates a modified structure for regulating the relative quantity of flow of the molten glass over one or more surfaces of the shaping element.

In the form of construction shown in Fig. 1, the glass is melted in a furnace 1 to which a forebay 2 maybe connected by a trough and also by frame parts that interconnect their supporting structures 3 and 4, such as the brackets 6. Preferably, a pot or trough 7 is located within the forebay to receive the glass from the outlet of the furnace which may be controlled by the gate 8. Preferably, the forebay is formed substantially cylindrical, and the central part of the bottom of the forebay, including the bottom of the trough 7 or pot, if used, is provided with a passageway or outlet 9 through which the molten glass will pass to the shaping element that is positioned below the outlet of the forebay.

If hollow glass tubing is to be formed by the glass-forming device, air may be introduced into the interior of the tubing, as it is formed, by the blow pipe 11. The bottom of the forebay may be provided with a shoulder 12 or recess, and a refractory sleeve 14 extending to near the shoulder 12 restricts the flow of the molten glass and also protects the blow pipe 11 enclosed within the sleeve from the heat of the molten glass. In order to cool the glass within the glass-forming device to produce the desired article-forming temperature and necessary viscosity, air is circulated over and in contact with the surface of the glass as it flows through the passageway or outlet 9 and the conduit 67 toward the shaping element. The glass cooling air or gas is directed through the pipe 16. The pipe 11 may be disposed in the pipe 16 and the sleeve 14 may be mounted on the pipe 16, thus the sleeve 14 may surround the air pipes 11 and 16.

The pipe 16 extends through the passageway or outlet 9 of the forebay, while the sleeve 14 extends to near an edge part 13 of the upper end of the passageway or outlet 9, to form an annular passageway intermediate the edge 14' of the refractory sleeve and the edge 9' of the forebay about the outlet, through which the glass flows, as illustrated in Fig. 2. The lower end of the sleeve thus surrounds the upper end of the passageway or outlet 9 and the glass moves between the edge 14' of the sleeve and the outlet and inwardly over the shoulder 12 and downwardly on to and spreads over the surface of the lower part of the passageway or outlet 9 in the form of a hollow cylindrical layer. The passageway or outlet 9 may have a bushing or lining 17 of a tough, highly refractory material to withstand the constant flow of the molten glass.

The forebay may be heated by flames produced by the burners connected to the outlets 25 of the gas supply pipe 20 (Fig. 4) that project their flames into the forebay through the parts 18. Also, the forebay may be provided with shiftably removable blocks 19 to enable the operator to view the flames and the interior of the forebay.

The forebay may be provided with a refractory distributor for distributing the glass that flows from the furnace to parts of the passageway in quantities that are uniform or that may be varied as desired. The distributor 21 is substantially cylindrical in form and surrounds the upper end of the passageway or outlet 9 and produces a substantially radial movement of the molten glass within the distributor toward the passageway. The feed distributor 21 is preferably provided with three or more lugs 22, to which rods 23 are secured by the pins 26. The rods extend through the top wall 24 of the forebay. The rods 23 may be provided with threaded upper ends 27 on which may be located rotatable nuts 30, of a size suitable for manual manipulation, to adjustably and pendantly support the lower end edge of the feed distributor with reference to the bottom 28 of the forebay and vary the depth of the edge parts of the lower edge of the distributor in the molten glass. The rods thus dispose portions of the lower edge in desired spaced relation with respect to the bottom to variously dam the molten glass flow from the furnace and produce the desired quantity flow of the glass beneath the lower edge of the distributor to the parts of the passageway or outlet 9, whether the glass comes from a point nearest the furnace, or is caused to move substantially circularly around the distributor to a point remote from the furnace. This will cause introduction of the glass to the parts of the passageway or outlet 9 at a desired flow rate and also at a desired quantity rate to produce the desired shapes of the glass articles. The rods 23 are preferably jacketed or sleeved by refractory sleeves to protect them from the heat of the furnace.

If desired, the feed distributor may be supported and adjusted by the pipes 31 having threaded end parts on which the nuts 30 may be located as in the form shown in Fig. 3. The lower ends of the pipes may be provided with metal plugs 33 in which the pins 26 may be inserted to connect the pipes to the lugs of the distributor. Also, smaller pipes 34 may be located in the pipes 31 for introducing cooling air within the pipes 31. The inner pipes 34 may be connected to a source of supply of compressed air by the pipes 36. Also, the outer pipes 31, ordinarily, will deliver the air to the atmosphere. Also, the pipes 31 may be jacketed by the refractory sleeves 37 to protect the pipes from the heat of the furnace.

The glass-forming device 38 comprises burners for heating its interior, a damper for the burnt gases and for controlling the heat and localizing it, a conduit for conveying the glass to the outlet, a glass-shaping element, and an enclosing shell for confining the heat about the glass as it is formed into definite shapes by the glass-shaping element. The glass-forming device 38 (Fig. 6) is adjustably supported by a plurality of rods 39 on the supporting frame or structure 3 of the forebay. The lower ends of the rods 39 are threaded, and nuts having handle parts 41 are located on the threaded ends of the rods that may be manually manipulated to adjust the device with reference to the bottom of the forebay. If desired, suitable locking nuts 42 may be provided for securing the forming device in its adjusted position with reference to the forebay.

The glass-forming device 38 is preferably supported in spaced relation from the bottom of the forebay to permit the outward movement of the exhaust products arising from the flames produced by the burners 43. The effective area of the opening that is thus formed at the upper end of the heat-confining shell 44 of the glass-forming device may be varied by a movable damper ring 46 that surrounds the upper end of the shell 44. The damper ring 46 may be adjustably located by means of the threaded rods 47 that are fixedly connected to the frame of the glass-forming device and extend through sprocket wheels 48, and the threaded rod 40 that extends into and is connected to a sprocket wheel 48. The rod 40 is located in the threaded sleeve 45, and, when turned, rises, or lowers, as the other sprocket wheels 48 are raised, or lowered, on the threaded rods 47. The sprocket wheels 48 are located in brackets 49 that engage and support the damper ring 46 to raise and lower the damper ring with respect to the exhaust gas outlet. The sprocket wheels are rotated on the rods 47 by a sprocket chain 51 that connects the wheels. When the chain 51 is operated, as by a suitable handle 52 that is connected to the rod 40 by the key pin 50, (Fig. 7), the rod 40 and its associated sprocket wheel 45 coast with the chain 51, and the other sprocket wheels 48 to raise or lower the damper ring as may be desired.

The sleeve 14 is mounted on the pipe 16 by the spacing lugs 57 secured to the pipe 16 and located near the upper and lower ends of the sleeve 14. The refractory sleeve 14 has a shoulder that engages the lugs 57 at its lower end to support the sleeve 14 on the pipe 16. By adjustment of the pipe 16, the sleeve is adjusted relative to the edge of the passageway or outlet 9. The pipe 16 may be adjusted by means of a threaded member or nut 60 that is rotatively located on the threaded end of the pipe and engages a part of the frame 3 of the forebay. If desired, the nut 60 may be provided with a gear wheel and remotely operated by a meshing gear wheel to produce adjustment of the pipe 16 and, particularly, the refractory sleeve 14 with reference to the passageway or outlet 9.

The upper end of the refractory sleeve 14 may, if desired, extend to near an opening 56 formed in a refractory block located in the top wall of the forebay. The other end communicates with the hollow cylindrical layer of glass that is formed in the passageway or outlet 9. The sleeve 14, may also be laterally adjusted with respect to the passageway or outlet 9 to produce a desired quantity flow along portions of the annular passageway formed by the end of the sleeve 14 and to regulate the quantity of the flow of the glass through the passageway, coactively with the regulative action that may be produced by the setting of the glass feed distributor 21 that causes glass to flow at a desired depth and horizontally or substantially so, to the edge of the passageway or outlet 9. The centering means comprises the rods 58 having, preferably, cylindrical extensions that may be threaded and located in the brackets 59 mounted on the top wall of the forebay and provided with the nuts 61 that may be manually operated to move the pipes and the sleeve 14, centrally or eccentrically with respect to the passageway or outlet 9. The rods 58 are connected to the pipe 16 by means of a ring 62 that may be clamped about the pipe. The air spaces provided by the coaxial interiorly spaced relation of the parts and the flowing air therein, effectively protect the pipes from the heat in the forebay.

The blow pipe 11 receives its air from a source of compressed air that issues through a nozzle 63 which forms a stream of air smaller than the blow pipe. The air is thus blown into the blow pipe and is directed under a pressure somewhat greater than atmospheric into the glass-shaping element and the tubing formed thereby. The blow pipe may be supported on a T-fitting located on the upper part of the larger cooling air pipe 16 by means of the interiorly threaded ring 64 which may be manually operated to adjust the blow pipe with reference to the glass-forming device. The air cooling pipe is also threaded and may be connected to a pipe 66 that is connected to the source of supply of air.

If desired, the two air pipes may receive air from the same source and the flow to the pipes regulated by suitable restriction valves to produce in each a desired resultant pressure.

The pipes 11 and 16 project into the conduit 67. The conduit has an interior diameter larger than the diameter of the passageway or outlet 9. The conduit is supported on the heat-confining shell 44 of the glass-forming device 38 by means of the blocks 68. Preferably, three blocks 68 extend into recesses 69 formed in the conduit 67. The blocks extend through openings 71 located in the wall of the shell 44 and may be tilted on raised edge parts of the blocks 70 and adjustably secure the conduit with respect to the wall of the shell 44 by means of the bolts 72 that extend through the brackets 73 which are secured to the metal supporting frame of the heat-confining shell. One set of the bolts extends downward for engaging the upper sides of the outer end parts of the blocks 68, and the other set of the bolts extends radially to engage the ends of the blocks 68 and thus, the conduit may be adjustably secured in contact with the bottom of the forebay and in axial alignment with the passageway or outlet 9 of the forebay.

The greater portion of the inner surface of the extension conduit 67 is preferably formed cylindrical. It has at its upper end an inner frustumal surface 74. The smaller end of the frustumal surface has the same area as the lower end of the surface of the passageway or outlet 9. The glass flows from the surface of the passageway and onto the surface of the upper end of the frustumal surface of the conduit 67, in layer form, and the glass layer on the lining 17 of the passageway is distended at the larger diameter of the lower end of the frustumal surface and spreads over the cylindrical surface of the conduit in the form of a thinner layer or film. It then flows down the interior cylindrical surface of the conduit to the lower end of the conduit 67, and, by reason of the adjustment of the glass feed distributor 21 and the lateral and vertical adjustment of the sleeve 14, there may be produced such distribution of the glass on the inner surface of the conduit as may be required to produce the desired shape of the ware.

The glass-shaping element may, according to the article to be formed, partake of different forms. In the form shown in Fig. 6, the conduit 67 and the element 53 are provided with shoulders 76 and 77 that are located on the glass-shaping element and on the conduit outlet, respectively. The shoulder 77 defines the glass outlet through which the glass from the forebay flows. Preferably, the exterior diameter of the shoulder on the element is smaller than the inner diameter of the shoulder on the conduit, to produce a free flow past the upper shoulder and along the inner surface of the conduit and a restriction at the lower shoulder between the shoulder and the outer surface of the element.

Refractory members 78 are located intermediate the shoulders 76 and 77 to support the glass-shaping element. The members 78 preferably are formed of refractory thin metal and preferably in tubular form. If desired, the tubular supporting members may have side portions removed from their ends to form semi-cylindrical supporting shoulders 79 and end spacing parts that may extend across shoulders and particularly the engaged surface of the shoulder of the conduit. The tubular parts are disposed so that their central axes are located parallel to the direction of glass flow. The parts being tubular, there is practically no lateral diversion in the glass stream, that might otherwise produce streaks.

The shaping element 53 is hollow, and the glass flow is restricted by the shoulders and particularly the lower shoulder of the conduit and by a member that may be supported within the element. The molten glass may be thus caused to accumulate, as indicated by the characteristic line 75. The delivery end 81 of the shaping element 53 is tapered to produce progressive union of the glass that moves on the exterior and interior surfaces of the element to its lower end. The blow pipe 11 extends to near the lower end of the element 53 and the glass tubing, as it is formed, receives sufficient air to sustain its wall in substantially cylindrical form, as it leaves the shaping element.

The lower end of the blow pipe 11 is spaced from the interior of the glass-shaping element 53 by the pins 80. A disc 82 which extends to near the inner convex surface of the lower end of the glass-shaping element is supported on the end of the blow pipe 11. If there is sufficient quantity of glass flow, the edge of the disc extends into the glass and coacts with the element, and the shoulders, to vary the flow of the molten glass. Also, a baffle 85, is located on the blow pipe near the outlet of the cooling air pipe 16 to cause the air from the pipe 16 to turn outward and upward and be distributed over the surface of the glass, as the glass descends on the surfaces of the passageway or outlet 9 and the conduit 67, to cool the glass to give it a desired viscosity. The air from the conduit 67 passes upward through the passageway or outlet 9, the refractory sleeve 14, the forebay 2, and through the opening 56 in the top of the forebay.

The quantity rate of the flow of the molten glass may be varied by the adjustment of the distributor 21 and/or the sleeve 14. If the quantity rate is relatively large, it may close the lower end of the pipe 16 and the flow of air from the opening 56 ceases, which can be easily determined by the operator and corresponding adjustments may be made.

The glass is kept at a level intermediate the top of the element and the lower end of the pipe 16 and preferably a little below the baffle 85. The baffle 85 reflects the cooling stream of air and distributes the air over the surface of the glass and also prevents excess cooling of the glass located substantially in line with the lower end of the pipe 16. Thus, a well of accumulated molten glass is retained in the lower end of the conduit to produce intermixing and diffusion of the body and surface parts of the molten glass that has its surface part rendered somewhat more viscous by the cooling air than the body part of the molten glass. The surface part is thus enabled to mix with the body part as it accumulates, and there is produced a uniform temperature and viscosity throughout the mass of glass that is formed into ware. The glass is thus modified and uniformly tempered by the contact of the cooling gas or air and subsequent intermixture preparatory to its formation into ware.

The glass-forming device is heated by the burners 43 that are connected to a source of gas supply. Preferably, the lower end of the shell 44 is beveled and the burners are located below the beveled edge. The burners are mounted on a circular pipe 83 and have end parts from which the flames protrude to direct the flames so that the central axis of each flame, as it leaves its burner, will be inclined at a slight angle to the vertical and turned so that their axes and that of the flames are disposed in planes that are tangential to a circle slightly smaller than the circle that passes through the centers of the burners. This produces a cone-shaped flame that surrounds the shaping element at the lower end thereof and the glass as it leaves the shaping element. Thus, a uniform flaming, gaseous, cloud-like ambient is produced within the space that the glass articles are shaped in by the shaping element.

If it is desired to produce a zonal high temperature in the heat-confining shell 44 and to controllably vary it as to location or definitely direct the heat to the molten glass on the shaping element or the molten glass within the conduit 67, a heat-confining shield 84 may be mounted above the burners and in the vicinity of the shaping element to substantially surround the conical flame. The shield is frustumal in form and adjustably positioned in the shell 44. The shield is supported by the rack bar 88 that is slidably supported in the slender cylindrical shell 89 which is connected to the glass-forming device. The rack bar meshes with a pinion 91 mounted on the shell and may be rotated by a suitable handle 92 to raise and lower the rack bar and the shield.

For the production of large tubing or thick-wall glass pipes, the refractory sleeve 14 preferably extends into the passageway or outlet 9 and is located in spaced relation thereto. The sleeve 14 is provided with a shoulder or ridge 93 that overhangs the upper edge of the passageway or outlet 9, or lining 17 through which the glass flows from the forebay to the outlet extension 94. The conduit 94 is substantially cylindrical throughout its length. The upper end of the conduit is pressed against the bottom of the forebay by the blocks 68, that may be adjustably located by the bolts 72 substantially as is disclosed in the form of the conduit of the glass-forming device shown in Fig. 6.

The conduit 94 is provided with a ledge or shoulder 96, and a frustumal shaped glass spreader 97, or distender, is supported on the shoulder by refractory pins 98 that are partially embedded in the refractory material of the spreader to support the spreader in proximity to and below the lower end of the lining 17, or bushing. Thus, as the glass flows from the surface of the passageway or outlet 9, in a hollow cylindrical form, it is engaged by the conical surface of the spreader which distends the glass and distributes it as a thinner layer upon the inner surface of the conduit 94.

A substantially conical refractory block 99 is supported on the lower end of the blow pipe 11 and within the lower end of the conduit 94. It may be connected to the blow pipe by means of a split ring 101 fitting a channel in the surface of the lower end of the blow pipe. The lower end part of the block 99 is surrounded by the glass-shaping element 102 that protrudes through the lower end of the outlet and shapes the molten glass from the forebay into glass articles, as it leaves the outlet.

The glass-shaping element is held spaced from the refractory block a distance that will enable a desired quantity rate of flow of the glass between the block and the element by the pins 103 that are embedded in the block. The shaping element 102 has a plurality of concentric metal shells 104 having downwardly extending skirt parts. The skirt parts may be of different or similar lengths that protrude downward from the outlet of the conduit, and thus coact to gather the molten glass centrally, or distribute it outwardly and also coact to delay the movement of the molten glass and together with the conical block 99, produce accumulation of the glass. Thus the major portion of the glass is delivered beneath that part of the outlet wherein is located the shell or shells having the longer downwardly extending skirt parts, such as those disposed nearest the outer edge of the outlet.

The shells may be connected to each other by suitable spacing rods 106 (Fig. 11) that space the shells to permit the flow between the shells as may be limited by the normal adherence of the glass as it moves over their surfaces. The glass-shaping element is supported by balls 107 of refractory material spaced about the element and located between the shoulder 108 that defines the outlet of the glass from the forebay and the shoulder 109 of the element and against an upwardly extending part of the conduit located near the edge of the outlet, such as the wall of the conduit. The shells 104 have narrow rings, or metal bands 100 (Fig. 11) at their upper edges and broad rings or bands at 110 at midpoints that are secured to the shells and operate to strengthen the shells and maintain their cylindricity. The bands have substantially the same thickness to form a relatively narrow space between the bands and the contiguous shells to hold the molten glass back and to assure free, normal delivery of the glass past the lower bands as regulated by its own weight and normal adhereability to the shells. The broader, lower bands being located below the upper bands and the shell spacing rods 106, produce greater resistance to flow of the glass, by reason of their greater width. The broader bands ensure closing of the glass diverted by the rods and insure a uniform smooth surface on the glass article and avoidance of all voids within the article. The glass flows down the inner surface of the conduit and accumulates at the lower end of the conduit substantially as indicated by the characteristic line 111.

In Figs. 12, 13 and 14 are shown shaping elements similar to that shown in Fig. 6, except that the shaping elements of Figs. 12, 13 and 14 are provided with centrally supported conical or tapered blocks 112 and 113. In the form of construction shown in Fig. 12, the shaping element 114 comprises the block 112 and a hollow part 116, similar to that shown in Fig. 6. The part 116 is supported by the tubular refractory sheet metal members 78 located intermediate shoulders disposed on the upper end of the conduit 67 and the part 116. An upwardly projecting teat 117 of the tapered block 112 is secured in the end of the blow pipe 11 to so dispose the tapered block as to form an annular passage-way between the broader or upper end of the block and the interior surface of the part 116 and produce a limited quantity flow of glass on the inner surface of the delivery end of the part 116. The block is spaced from the part 116 by the pins 80. The glass that flows on the exterior and interior surfaces of the part 116 is united at its lower edge. Glass in the form of a solid bar is drawn from the shaping element 114. Lowering the block 112 to near, or slightly below the edge, by the adjustment of the pipe 11, increases the flow of glass from the inner surface to the part 116.

In the form of construction shown in Figs. 13 and 14, the tapered block 113 has a small bore 119 that extends through the lug, or teat, protruding from its base, or broader end of the block, which may be secured in the lower end of the blow pipe. The tapered block is inverted so that its pointed end is located below the level of the tapered edges of the part 116 of the shaping element. The tapered block is spaced from the part 116 of the shaping element 121 to form a narrow annular passageway by spacing pins 80 secured in the wall of the blow pipe. Therefore, as the glass is delivered from the shaping element 121, the air from the blow pipe, having a pressure slightly greater than atmospheric, produces a small bore tubing instead of the solid rod produced by the form of construction shown in Fig. 12.

In the form of glass-forming device shown in Figs. 15 to 20, the glass-shaping element 123 is preferably pyramidal in form and may be provided with a small bore 124 that extends through a teat 126, that protrudes from the inverted pyramidal block, and may be secured in the lower end of the blow pipe 11. The glass-forming device produces a prismatic shaped tube having a small bore such as is sometimes used in thermometers and other testing or indicating devices, wherein columns of colored fluids are used to indicate conditions sought.

Also the glass-forming device is particularly for producing tubular glass from two or more molten glasses having distinctive characteristics and to dispose one glass in definite areas and in definite relation to the other glass or to other glasses, as at 125, and the bore formed in the glass, as at 130. Thus, the outlet conduit 67, of the form shown in Fig. 6, may be provided with a frustumal inner end surface 135 and a pyramidal glass-shaping element 123 located in an outlet 127 having a contour corresponding to a cross-section of the pyramidal element, through which the molten glasses are conjunctively discharged. The glasses that combine with the glass from the forebay may be produced from distinctive batch materials, and, while in a molten state, joined with the glass from the forebay or other container, at the outlet of the conduit 67, each in a defined area of the outlet and by a means that prevents material diffusion of the glasses and yet produces adherence of the different glasses to each other.

The frustumal surface 135, at the lower end of the interior surface of the conduit 67, causes the glass to move inwardly from the cylindrical surface, that forms a major portion of the interior surface of the conduit, toward the outlet 127. A part of the conical surface is omitted along one side of the end portion of the conduit and a sloping wall 128 is formed to produce a chambered part having a lip 129 that forms a narrow outlet 131 located at and preferably, slightly over the edge of the outlet of the conduit in which the pyramidal shaping element 123 is disposed. The lip 129 may extend over the outlet of the conduit to produce delivery of the glass from the chamber into the glass passing through a major part of the outlet 127.

The lower end of the conduit 67 thus forms an outlet that connects with the chamber formed by the lip that is connected to a molten glass producing apparatus 132 located beside the conduit and within the heat-confining shell 44. The molten glass producing apparatus may include a cylinder 133 of small diameter that may be electrically heated as by the wire 134, which is connected to a source of electric current through the binding posts 136, and may also be heated by the burners 43 that heat the interior of the heat-confining shell 44.

Batch materials properly mixed and formed into balls, or briquets, are fed as desired into the cylinder 133 through a pipe 137, inclined to the vertical, from the exterior of the heat-confining shell 44. When the glass batch materials are melted by the heat produced by the electric heater and the burners, the glass flows through the passageway 138 into the chamber formed by the lip 129 and into the outlet 127 of the conduit to eventually produce a solid, characteristic glass disposed on one side surface of the article as illustrated in Fig. 16, or in one part of molten glass, having a different characteristic, or produce an embedment of one glass within another glass, as illustrated in Fig. 20.

In the form of construction shown in Figs. 18 to 20, a Nichrome metal nozzle 139 may be disposed over the conduit outlet and a glass having a characteristic other than that delivered from the forebay may be directed through a tubular member 141 into the nozzle 139 that is located over the outlet 127 of the conduit. A characteristic glass may be formed in an electrically heated molten glass producing apparatus 132 located in the heat confining shell 44. The nozzle 139 directs the flow of the glass downwardly at a point spaced inwardly from the edge of the outlet 127 of the conduit to produce from the two molten glasses, when cooled, a glass body that has one glass 125 completely enclosed in the other glass.

In the form of the shaping element shown in Figs. 22 to 24, a pair of shells 142 and 143 (Fig. 22), having different diameters and lengths, may be located, preferably, the smaller in length and in diameter, within the larger and longer, and connected to each other by short rods 144 disposed radially. In order to produce a material accumulation of glass by the element, and a large thick glass wall, a refractory block 99 is located within the inner shell of the element and also the element may be provided with a plurality of exceedingly short shells, small bodies, or rings 145 of different diameters and formed of bars, disposed or distributed intermediate and preferably in the vicinity of the plane of the lower edges of the shells 142 and 143 and concentric therewith. Preferably, the short shells or rings 145 or small refractory bodies are secured by the lower of the radially extending refractory metal rods 144 that are secured to the lower edge parts of the shells and operate to hold and support the parts in spaced relation, and substantially at the plane of the lower edges of the shells 142 and 143.

The article produced from the element has a large central bore and the refractory block 99, or distributor of the glass is spaced from the shell 143 by the spacing pins 103 embedded in the refractory block. The shaping element may be supported in the outlet of the conduit by inwardly and outwardly extending shoulders, one disposed on the lower end of the conduit and the other on the upper edge of the outer shell, and balls 107, may be disposed intermediate the shoulders and against the inner surface of the conduit.

Because of the relatively free movement of a large part of the glass over the rings 145 of the shaping element and relative slow movement over wider or longer inner and outer shells 142 and 143, the delivery of the thick tubular glass is closely regulated to insure a complete supply of glass to the shells over which, by reason of their length, the glass moves slowly to form the inner and outer surface glasses and give opportunity to produce a slight greater hardness or viscosity than the glass that may be fed through the rings 145. By the restriction to glass flow, the glass accumulates in the conduit as indicated by the line 111.

The outer surface portions of the glass of the tube, formed by the longer outer shell 142, is engaged, when the glass has somewhat cooled, by two pairs of grooved rollers 115 that may be adjustably spring pressed toward each other. The rate of rotation of one pair of opposing rollers 115 is produced by the motor 118, as controlled by the rheostat 120. The motor operates the rollers 115 through a suitable speed reducing gear 122 to cause a regulated slow movement of the glass from the shaping element to reduce the interior and exterior surface contraction of the formed glass by the relatively slow delivery movement thus produced. The motor may be connected to a source of supply of electric current through the lines and switch 140.

In the form of shaping element shown in Figs. 25 to 28, the skirted shells that form the element differ from the shaping element shown in Figs. 9 to 11, in that the shells 146 have skirts of substantially the same length, and the shells are located eccentric with reference to each other to produce glass delivery at a uniform movement rate from the lower edges of the shells, but at a greater quantity rate on one side of the axis of the shaping element than on the other side, and at a progressively increasing quantity rate from one side to the other.

The shells 146 of the shaping element 147 are bonded together and spaced from each other by the rods 148 located near the upper ends of the shells. The shaping element is supported in the outlet by the shoulders 149 and 151 that extend, respectively, inwardly from the lower end of the conduit and outwardly from the upper end of the outer shell, and the balls 107, disposed in spaced relation about the outlet, and located intermediate the said shoulders and the inner surface of the conduit. A disc 150, is supported on the end of the blow pipe 11 to cause accumulation of glass as indicated by the characteristic line 111. The blow pipe 11 and the disc are spaced from the inner shell by the pins 80.

The glass, by reason of the relative location of the shells, moves at a greater quantity rate through the element on one side, as at 152 (Fig. 26) of the axis of the center of the glass body than it does on the other side, as at 153, but at the same flow rate, or movement rate, to produce thereby a wall in the tubular article of progressively increased thickness, as measured circularly about the axis of the tube. When the tube formed by the glass-shaping element 147 is circularly bent or spirally shaped by heating and bending, and if the curvature formed is sufficiently great, the greater wall thickness of one side of the tubing glass is reduced by its greater elongation and produces a curved tube that has substantially a uniform wall thickness as measured circularly about the central axis of the tube.

In the form of the shaping element shown in Fig. 29, the metal shells 104 are arranged substantially concentrically and are constructed to have inner and outer bands that perform the same purposes that the corresponding bands 109 and 110, perform, as described with reference to the form of the glass-shaping element shown in Figs. 9, 10, 11, except that the upper bands 109 are secured to the inner surfaces of the shells and the lower bands 110 are secured to the outer surfaces of the shells.

The shells 104 are supported on a refractory collar 106 that is connected to the lower end of the blow pipe 11 by a removable split metal ring 154 located in a channel formed in the lower end of the blow pipe 11. The refractory collar 106 has a shoulder 155 and the shells 104 are supported on the shoulder by tubular metal spacing members 156 located intermediate the bands 109 and 110 and intermediate the band 109 of the inner shell and the shoulder 155 of the collar 106 and also by the studs 157 that are secured in and project outwardly from the outer shell 104 to engage the inner surface of the conduit 158 through which the glass moves to the glass-shaping element. The studs 157 have rounded outer ends that engage and are slidably movable over the inner surface of the conduit 158. The tubular members 156 engage the bands at their end edges, and the members and the studs are suitably spaced along edge parts of the shells. In the form of the conduit shown in Fig. 29, the glass moves along the surface at the lower end of the conduit without interruption or diversion in its movement by a ridge or shoulder as presented in the other forms of conduits. The outermost band 110 may be located relatively close to the lower edge of the conduit to produce at the glass delivery point the desired restriction to prevent formation of streaks in the formed ware by the studs 157 in the same manner that the restriction afforded by the bands 110 prevent formation of streaks by the supporting members.

The element may be adjusted with reference to the conduit 158 by the relative adjustment of the location of the blow pipe 11 by the nut 64 shown in Figs. 1 and 4. The construction shown in Fig. 29 provides a glass-shaping element that may be raised or lowered to vary the glass quantity that flows on the outside surface of the element and also one that may be readily mounted in position or removed and shells substituted, or the number of shells varied. Thus, the glass quantity emitted, may, by the addition of parts, be varied to produce tubes of varying wall thickness and likewise to produce varying restrictions to the glass flow.

In the form of construction illustrated in Fig. 30, the glass shaping element is supported on a pipe 168, where in the form of constructions shown in Figs. 6, 9 and 29, the glass shaping element is supported on the pipe 11. The shaping element is connected to the pipe 168 by a refractory collar 106 and a removable metal split ring 154. The collar 106 has a shoulder 155 on which the shaping element may be supported. The blow pipe 11 extends through the pipe 168 and protrudes through the upper end of the air cooling 16 pipe and its T-fitting connection with the pipe 66 that connects the pipes 16 and 66 with the source of supply of compressed air as controlled by the valve 166. The blow pipe 11 also protrudes from the lower end of the pipe 168. The pipe 168 is adjusted by the nut 64 that engages the T-fitting of the pipe 16, to adjust the glass shaping element relative to the lower end of the conduit 158.

The blow pipe 11 is connected to the source of supply of gas by the T-fitting 162 and the pipe 161 as controlled by the valve 163. The upper end of the blow pipe 11 is threaded and has a nut 171 that engages the upper end of the pipe 168 and is manually rotatable to adjust the blow pipe 11 by the engagement of the upper end of the pipe 168. The lower open end of the blow pipe 11 is connected to a refractory disc 172 having an edge part located near the flaring skirt 165 of the inner shell of the glass shaping element and thus the flow of glass over the inner surface of the element may be adjusted by the adjustment of the blow pipe 11. The blow pipe 11 is contained within the pipe 168 and the pipes 11 and 168 are contained within the pipe 16. The pipe 16 is adjusted by the nut 60, that engages a part of the supporting structure of the forebay, to adjust the refractory sleeve 14 relative to the passageway or outlet 9, and vary the location of the glass shaping element 164 and the disc 172 within the conduit by the intersupport of the adjusting nuts 64 and 171 on the pipe 16.

The shells of the element 164 are provided with the bands 109 and 110, as in the form shown in Fig. 29 and perform the same functions as to restriction of flow of the molten glass to produce the required accumulation of molten glass within the conduit 158, as indicated by the characteristic line 111. The shells intersupport each other by the members 156 located intermediate the shoulders 109 and 110, in conjunction with the studs 157 having outer ends that engage the inner surface of the conduit 158.

The conduit 158 may, if desired, in part conform to the glass forming device illustrated in Figure 9, which is particularly adapted for the formation of large glass tubing having relatively thick walls. The conduit 158 is provided with the conical distender 97 that is supported on the shoulder, or ledge 96, by means of the studs 98 that are embedded in the material of which the conical distender 97, or block, is formed. The distender directs the glass received from the passageway or outlet 9 in layer form to the surface of the conduit and thus distends the glass to form a larger and thinner layer on the cylindrical surface of the conduit.

A baffle 85 is supported on the lower end part of the pipe 168 to produce diversion and distribution of the cooling air over the surface of the glass within the conduit and the passageway or outlet 9. The air thus moves upwardly over the surface of the glass until it exits through the sleeve 14 and the outlet 56 in the top of the forebay.

The shells of the shaping element have skirt parts that flare, as at 165, and the lower end edge of the surface of the conduit 158 is beveled, or inclined to the vertical, or formed to have a small frustumal surface 167, preferably conforming substantially to the frustumal surfaces formed by the flaring skirts 165 on the shells, forming, thereby, an outlet for the molten glass exterior to the element that may be, if desired, closed or varied in its effective area for the exit of the glass, according to the adjustment of the pipe 168, with reference to the conduit. Also the disc 172 of refractory metal, located on the lower end of the blow pipe 11, has an edge part located near the inner surface of the skirt of the smaller and innermost of the shells of the shaping element that may be varied in its location to prevent, or to restrict the outflow of the molten glass, and thus vary the amount of glass that flows over the inner surface of the innermost shell in forming the ware. Thus the glass flow may be restricted to produce desired accumulation in the lower end of the conduit as indicated by the characteristic line 111 and the relative flow of the glass on the inner or outer, or both of the said surfaces of the element may be varied, by the relative adjustment of one or more of the pipes 16, 168 and 11.

I claim:

1. In an apparatus for forming glass articles, a container for containing molten glass having an outlet; a conduit extending below the outlet; means for spreading a glass layer on the inner surface of the conduit; a source of supply of air; a pipe connected to the source for flowing air into the conduit; a baffle for deflecting the air to cause the air to spread to and flow over the surface of the layer of the glass; and means for removing the air from the conduit.

2. In an apparatus for forming glass articles, a container for containing molten glass having an outlet; a conduit positioned below the outlet; means for flowing glass downwardly and spreading the glass in thin layer form over the inner surface of the conduit; a source of supply of air; a pipe connected to the source and having an outlet near the lower end of the conduit for flowing cooling air upwardly over the surface of the layer of glass; and a member having an inlet above the said outlet of the pipe communicating with said conduit for removing air from within said conduit.

3. In an apparatus for forming glass articles, a container for containing molten glass having an outlet; a conduit positioned below the outlet; means for spreading glass in a thin layer on the inner surface of the conduit; a glass shaping element positioned in the lower end of the conduit to partially close the same; a source of supply of air; a pipe connected to the source for flowing air over the surface of the thin layer of glass within the conduit; and a member positioned above the shaping element and having an inlet communicating with the interior of the conduit for removing the air heated by the glass from the conduit.

4. In a glass article producing apparatus, a container for containing molten glass having an outlet; a conduit positioned below the outlet; means for producing downward flow of molten glass in layer form in the conduit; a glass-shaping element positioned in the lower end of the conduit to partially close the same; a source of supply of cooling air; a pipe connected to the said source and having an outlet within said conduit; and a member communicating with said conduit and having an inlet above the said outlet of said pipe to permit movement of the air over the surface of the layer of glass in the conduit.

5. In glassware-forming apparatus, a source of molten glass, a conduit communicating at its upper end with said source and having an outlet at the lower end thereof, means forming a ring-like opening for causing the molten glass passing into said conduit to flow downwardly in film form along the inner surface thereof, a glass-shaping element adjacent the lower end of the conduit for forming the molten glass into ware, means communicating with said conduit for cooling the glass as it flows downwardly in film form along the inner wall of said conduit, and means cooperating with said conduit for heating the outer surface of said conduit as the glass flows downwardly along the inner surface thereof.

6. In glassware-forming apparatus, a source of molten glass, a vertical, non-rotatable conduit communicating at its upper end with said source and having an outlet at the lower end thereof, means adjacent the upper end of the conduit forming a ring-like opening for causing the molten glass passing into said conduit to flow downwardly in film form along the inner surface thereof, a glass-shaping element adjacent the lower end of said conduit for forming the molten glass into ware, said glass-shaping element being arranged to restrict the flow of glass from the lower end of said conduit to provide an accumulation of glass therein, means communicating with said conduit for blowing cooling air into the conduit, and a baffle for shielding the glass accumulated within the conduit from said cooling air as it enters the conduit.

EDWARD DANNER.

REFERENCES CITED

The following references are of record in the file of this patent:

UNITED STATES PATENTS

| Number | Name | Date |
|---|---|---|
| 1,239,024 | Manning | Sept. 4, 1917 |
| 1,571,216 | Soubier | Feb. 2, 1926 |
| 1,612,419 | Danner | Dec. 28, 1926 |
| 1,653,848 | Grotta | Dec. 27, 1927 |
| 1,892,477 | Weber | Dec. 27, 1932 |
| 1,920,366 | De Silva | Aug. 1, 1933 |
| 1,926,410 | Soubier | Sept. 12, 1933 |
| 1,933,341 | Richardson | Oct. 31, 1933 |
| 1,949,037 | Cardot | Feb. 27, 1934 |
| 1,963,910 | McIntyre et al. | June 19, 1934 |
| 1,975,737 | Sanchez-Vello | Oct. 2, 1934 |
| 2,006,947 | Ferguson | July 2, 1935 |
| 2,009,326 | Sanchez-Vello | July 23, 1935 |
| 2,009,793 | Sanchez-Vello | July 30, 1935 |
| 2,052,269 | Woods | Aug. 25, 1936 |
| 2,085,245 | Woods | June 29, 1937 |
| 2,131,417 | Danner | Sept. 27, 1938 |
| 2,150,017 | Barnard | Mar. 7, 1939 |
| 2,226,498 | Koob | Dec. 24, 1940 |
| 2,251,727 | Wellech et al. | Aug. 5, 1941 |
| 2,390,925 | Danner | Dec. 11, 1945 |

FOREIGN PATENTS

| Number | Country | Date |
|---|---|---|
| 38,432 | France | Mar. 3, 1931 |

(Addition to No. 693,153)